United States Patent Office 3,406,218
Patented Oct. 15, 1968

3,406,218
QUINOL ETHER AS ANTIOXIDANT
Margaret A. Da Rooge, Dearborn Heights, and Lee R. Mahoney, Livonia, Mich., assignors to Ford Motor Company, Dearborn, Mich., a corporation of Delaware
No Drawing. Filed Mar. 30, 1967, Ser. No. 626,986
2 Claims. (Cl. 260—666.5)

ABSTRACT OF THE DISCLOSURE

Small amounts of 4-(4-methoxy-phenoxy)-2,4,6-tri-t-butyl-2,5-cyclohexadien-1-one are unusually effective in inhibiting oxidation of organic substances. The compound also synergizes with small amounts of 2,4,6 - tri-t-butylphenol.

Most of the prior art oxidation inhibitors for organic compounds containing hydroxyl or amine radicals that block oxidation by interfering with some portion of the oxidation reaction. Phenol, purpurogallin, and dihydroxydiphenyl amine are typical of these prior art inhibitors and the inhibition mechanism involves abstracting from the hydroxyl or amine radical a hydrogen atom that blocks the oxidation reaction. In general, these prior art compounds are not useful in stabilizing acidic organic materials because the hydroxyl or amine radicals are rapidly neutralized in an acid-base reaction and therefore are unavailable for the inhibition reaction.

This invention relates to a process for the inhibition of oxidation of oxidizable organic substances by adding to such substances as an oxidation inhibitor a 2,4,6-tri-t-butyl-4-phenoxy quinol ether. Such a phenoxy quinol ether which has been found to be particularly effective is 4-(4-methoxy - phenoxy)-2,4,6-tri-t-butyl-2,5-cyclohexadien-1-one which is represented structurally by the following formula:

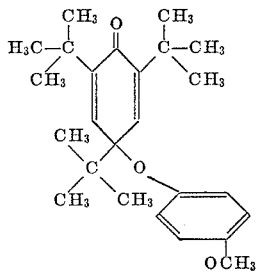

This preferred phenoxy quinol ether has been found to inhibit the rate of oxygen absorption by chlorobenzene solution of 9,10-dihydroanthracene in the presence of an initiator (2,2,3,3-tetraphenylbutane) and oxygen at 60° C. It has been found to stop two radicals per molecule. It also synergizes with 2,4,6 - tri - t-butylphenol. This particular quinol ether is a unique type of inhibitor since it contains no abstractable hydrogen atoms.

Data for the rates of oxygen inhibition in 9,10-dihydroanthracene in chlorobenzene solution containing 2,2,3,3-tetraphenylbutane as intiator are shown in the following table. The experiment is carried out in an enclosed system under the listed oxygen pressure. From the known decomposition rate of the initiator and the measured rate of reduction in oxygen pressure, it is possible to compute the effect of the inhibitor in stopping the decomposition and thence in stopping oxidation. This effect is reported as the number of radicals stopped.

9,10-dihydroanthracene=0.148 M
Tetraphenylbutane (initiator)=0.00122 M
Oxygen pressure=690 mm

| Conc. 4-OCH; quinol ether, moles×10⁻⁴ | Conc. 2,4,6 tri-t-butylphenol, moles×10⁻⁴ | Length of inhibition period, min. | Number of radicals stopped |
|---|---|---|---|
| 1.05 | 0 | 7 | 2.0 |
| 1.57 | 0 | 11 | 3.10 |
| 2.10 | 0 | 16 | 4.34 |
| 2.1 | 1 | 25 | 6.39 |
| 1.4 | 1 | 21 | 5.52 |
| .7 | 1 | 12 | 3.34 |
| 2.0 | 2 | 32 | 7.88 |
| 1.5 | 2 | 27 | 6.84 |
| 1.0 | 2 | 23 | 5.96 |
| .5 | 2 | 19 | 5.08 |
| 0 | 0 | -------- | 0 |
| 0 | 1 | -------- | 0 |
| 0 | 2 | -------- | 0 |

We claim as our invention:
1. The process of inhibiting the oxidation of an oxidizable organic substance comprising adding to such oxidizable organic substance 4 - (4-methoxy-phenoxy)-2,4,6-tri-t-butyl-2,5-cyclohexadien-1-one.
2. The process recited in claim 1 in which the system contains 2,4,6-tri-t-butylphenol.

References Cited

UNITED STATES PATENTS

| 2,770,545 | 11/1956 | Thompson | 260—666.5 X |
| 3,004,042 | 10/1961 | Coppinger | 260—666.5 X |
| 3,270,072 | 8/1966 | Pesacreta | 260—666.5 |

OTHER REFERENCES

Becker: "Preparation of Quinol Ethers," J. Org. Chem. 29, 3068–70 (1964).
Eugen Müller et al.: "New Syntheses of Quinol Ethers," Ann. 673, 40–59 (1964).
Waring: "Cyclohexadienones (Review)," Advan. Alicyclic Chem. 1, 129–256 (1966).
Rieker: "Reactions with Aroxyl Radicals" Chem. Ber., 98, 715–21 (1965).
Matsuura and Ogura: "2,4,6-tri-t-butyl-4-methoxy-2,5-cyclohexadienone," J. Am. Chem. Soc., 89, 3846–50 (1967).

DELBERT E. GANTZ, Primary Examiner.
G. E. SCHMITKONS, Assistant Examiner.